United States Patent [19]

Marais

[11] 4,036,307
[45] July 19, 1977

[54] PLOUGH SHARE WITH REINFORCEMENT PLATE COVERING TONGUE HOLES THEREIN

[76] Inventor: Sarel Johannes Marais, Lang St., Moorreesburg, Cape Province, South Africa

[21] Appl. No.: 676,999

[22] Filed: Apr. 14, 1976

[51] Int. Cl.² .............................................. A01B 15/06
[52] U.S. Cl. ..................... 172/749; 172/753; 172/760; 403/375; 403/393
[58] Field of Search ............... 172/719, 749, 750, 751, 172/753, 754, 760; 403/353, 375, 393

[56] References Cited

U.S. PATENT DOCUMENTS

| | | | |
|---|---|---|---|
| 1,247,938 | 11/1917 | Curtenius | 403/375 X |
| 1,670,424 | 5/1928 | Sanders | 172/753 |
| 1,980,154 | 11/1934 | Coe | 403/375 UX |
| 1,992,791 | 2/1935 | Wannemacher | 172/719 |
| 2,051,328 | 8/1936 | Christensen | 172/719 |
| 2,280,681 | 4/1942 | Altgelt | 172/760 |
| 2,634,664 | 4/1953 | Benner | 172/749 |

FOREIGN PATENT DOCUMENTS

| | | | |
|---|---|---|---|
| 601,095 | 11/1925 | France | 172/760 |
| 375,048 | 2/1907 | France | 172/753 |
| 518,818 | 2/1931 | Germany | 172/719 |
| 105,451 | 9/1942 | Sweden | 172/719 |

Primary Examiner—Richard T. Stouffer
Attorney, Agent, or Firm—Larson, Taylor and Hinds

[57] ABSTRACT

A plough share made of metal having at least two spaced tongues pressed out of the metal and projecting rearwardly at an angle, the two tongues being adapted to engage in complementary holes formed in the frog of a plough. The plough share also has holes therein, these being formed by the tongues being pressed outwardly therefrom. These holes are covered by a reinforcement plate, which is attached to the side of the plough share opposite to the side to which the frog is to be attached.

7 Claims, 8 Drawing Figures

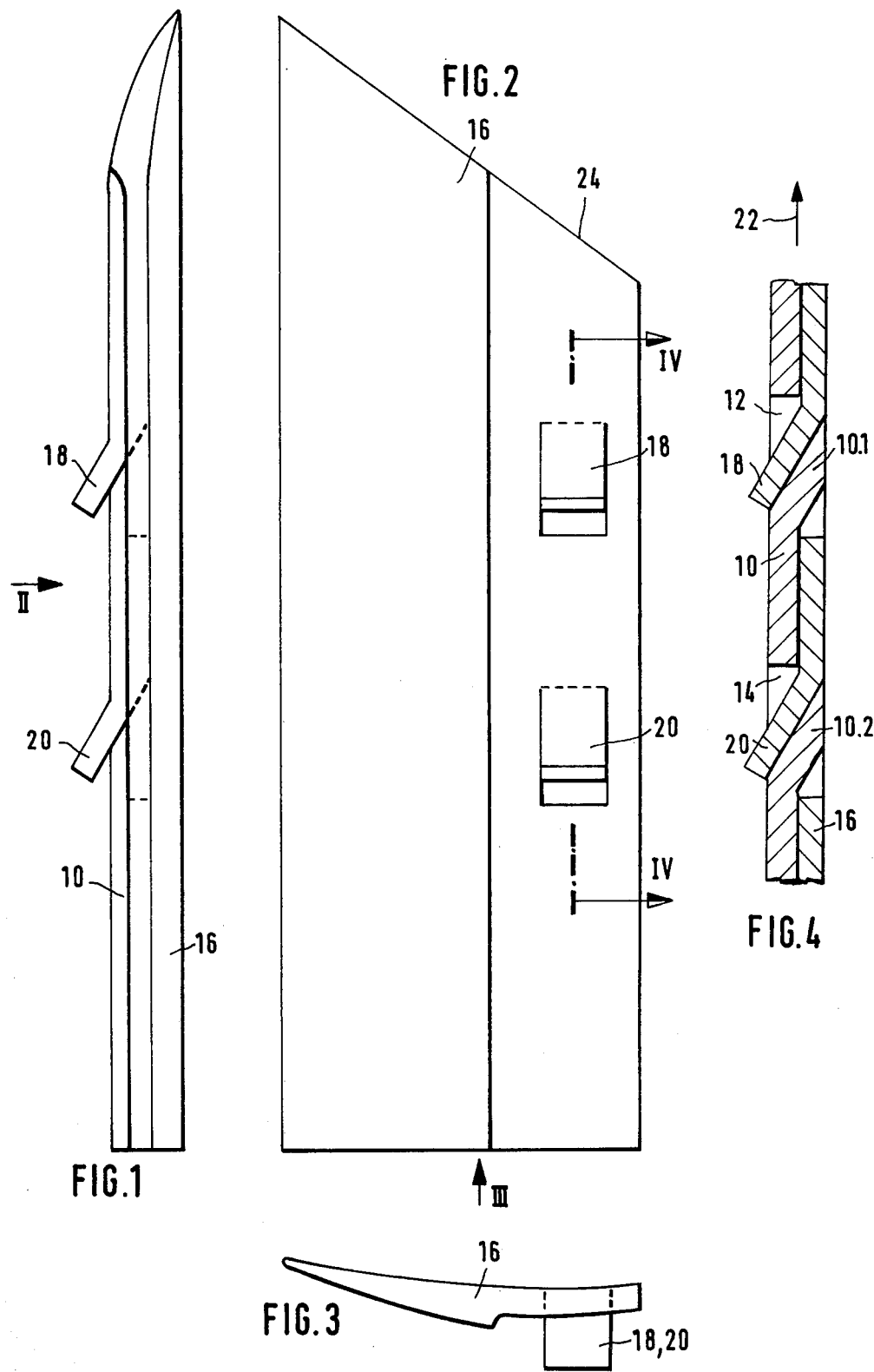

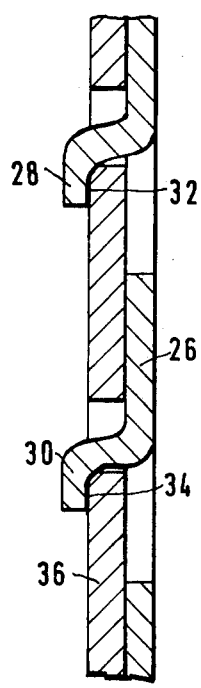
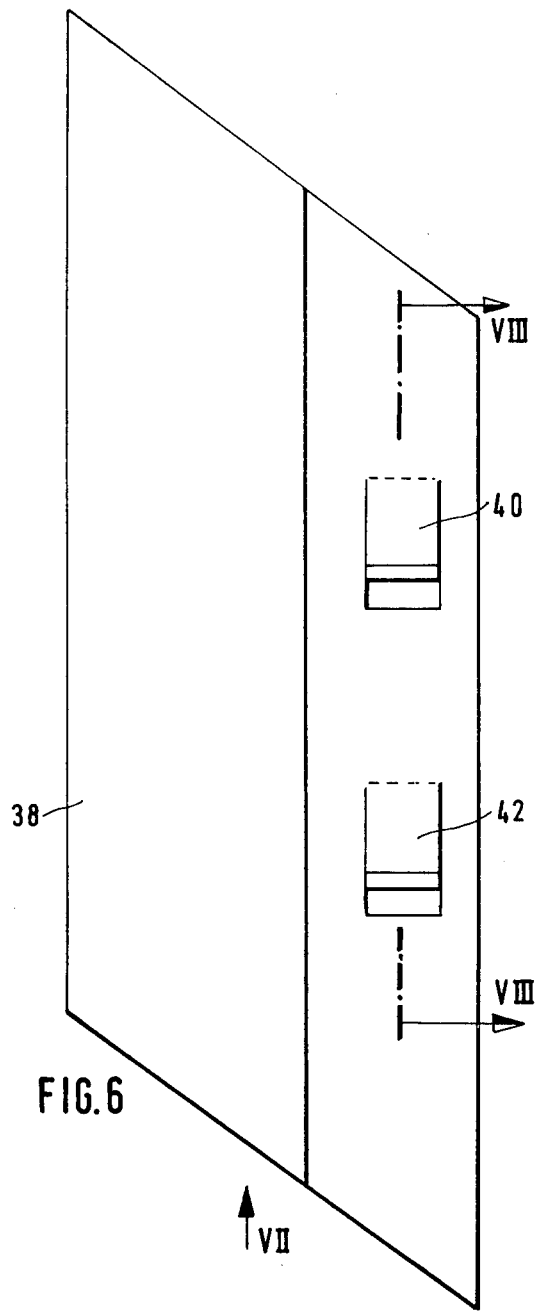
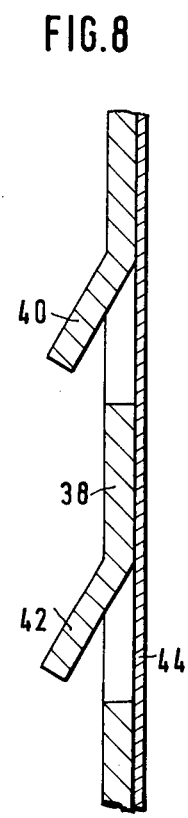
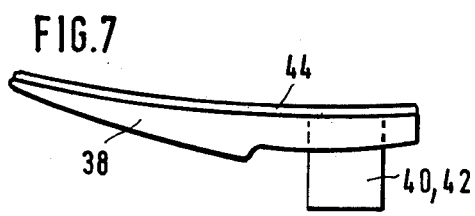

PLOUGH SHARE WITH REINFORCEMENT PLATE COVERING TONGUE HOLES THEREIN

The present invention relates to plough shares.

More particularly, the invention relates to mouldboard plough shares.

In mouldboard ploughs the plough has a number of frogs to each of which a share is removably connected.

It is an object of the invention to provide a simple connection arrangement between a share and a frog of a plough.

According to the invention, there is provided a plough share made of metal plate, the share having a straight cutting edge, a convex inner curved side and a substantially parallel convex outer curved part, and a thickened outer part adjacent the outer curved part which converges towards the straight cutting edge, the share further including at least two spaced tongues pressed out of the metal plate from the convex inner curved side to the outer curved part and thereby forming holes in the metal plate, the tongues projecting on the outer curved part rearwardly and being adapted to engage in complementary holes formed in the frog of a plough, and a reinforcement plate attached to the plough share on the convex inner part thereof opposite to the side to which the frog is to be attached and, the reinforcement plate covering the holes formed by the pressed out tongues.

The tongues may be of rectangular shape.

The reinforcement plate may cover at least most of the metal plate.

The metal plate may be of parallelogram shape.

The tongue may be pressed out to be at an inclination of about 30° to the general plane of the metal plate.

The invention will now be described by way of example with reference to the accompanying schematic drawings.

In the drawings there is shown in

FIG. 1 a side view of a first embodiment of a share in accordance with the invention as fitted on the frog of a ploug;

FIG. 2 plan view of the share only seen along arrow 11 in FIG. 1;

FIG. 3 an end view of the share seen along arrow III in FIG. 2;

FIG. 4 a sectional side view corresponding to FIG. 1 but showing only a part of the share and frog, this view taken along arrows IV — IV in FIG. 2;

FIG. 5 a sectional side view corresponding to FIG. 4 but showing a second embodiment of a share in accordance with the invention;

FIG. 6 a plan view of a third embodiment of a share in accordance with the invention;

FIG. 7 an end view of the share seen along arrow VII in FIG. 6; and

FIG. 8 a partial sectional side view of the share seen along arrows VIII—VIII in FIG. 6.

Referring to FIGS. 1 and 4, the frog 10 of a plough (not shown) has two spaced holes 12, 14. The share 16 has two spaced straight tongues 18, 20 pressed out of the material of the share and being adapted to fit into the holes 12, 14 as illustrated in FIG. 4. The travelling direction of the plough is indicated by arrow 22. The leading edge ofthe share 16 is indicated by reference numeral 24.

The share 26, illustrated in part in FIG. 5, is similar to the share 16 of FIGS. 1 to 4, but its tongues 28, 30 are slightly curved as illustrated. Furthermore the tongues 28, 30 are respectively slightly chamfered at 32, 34 to ensure a wedge type gripping action with the frog 36.

Referring to FIGS. 6 to 8, the share 38 has two spaced straight tongues 40, 42 pressed out of the material of the share, and these tongues 40, 42 (as is the case in FIGS. 1 to 4) are adapted to fit into the holes 12, 14 of the frog 10 of a plough. On the back of the share 38 a sheet 44 of special hard material is welded or otherwise attached thereto. This sheet 44 serves to strengthen the share 38, in particular at the stress concentrations taking place about the holes formed when pressing out the tongues 40, 42. The sheet 44 also assists in protecting the tongues (10.1 and 10.2 in FIG. 4) of the frog 10 against wear.

I claim:

1. A plough share made of metal plate, the share having a straight cutting edge, a convex inner curved side and a substantially parallel convey outer curved part, and thickened outer part adjacent the outer curved part which converges toward the straight cutting edge, the share further including at least two spaced tongues pressed out of the metal plate from the convex inner curved side to the outer curved part and thereby forming holes in the metal plate, the tongues projecting on the outer curved part rearwardly and being adapted to engage in complementary holes formed in the frog of the plough, and a reinforcement plate attached to the plough share on the convex inner part thereof opposite to the side to which the frog is to be attached and, wherein the reinforcement plate covers the holes formed by the pressed out tongues.

2. A plough share as claimed in claim 1, in which the tongues are of a rectangular shape.

3. A plough share as claimed in claim 1, in which the reinforcement plate covers at least most of the metal plate.

4. A plough share as claimed in claim 1, in which the metal plate is of parallelogram shape.

5. A plough share as claimed in claim 1, in which the tongues are pressed to be at an inclination of about 30° to the general, plane of the metal plate.

6. In combination a plough share made of a metal plate, the share having a straight cutting edge, a convex inner curved side and a substantially parallel convex outer curved part, and a thickened outer part adjacent the outer part adjacent the outer part which converges towards the straight cutting edge, the share further including at least two spaced tongues pressed out of the metal plate from the convex inner curved side to the outer curved part and thereby forming holes in the metal plate, the tongues projecting on the outer curved part rearwardly, and a frog of a plough having two holes spaced complementary to the two tongues of the share, and the tongues of the share engaging in the holes of the frog, and the share further including a reinforcement plate attached to the plough share on the convex inner part thereof opposite to the side to which the frog is attached and, wherein the reinforcement plate covers the holes formed by the pressed out tongues.

7. A combination in accordance with claim 6 wherein the frog further includes at least two tongues, the tongues projecting on one side of the frog forwardly, the tongues of the frog being complementary to the holes of the share and engaging the holes of the share so as to be positioned behind and in contact with the tongues of the share, wherein the reinforcement plate relieves the stress concentration on the holes of the share and protects the tongues of the frog engaged in the holes of the share.

* * * * *